United States Patent
Chen et al.

(10) Patent No.: US 7,495,934 B2
(45) Date of Patent: Feb. 24, 2009

(54) ADAPTIVE SYNCHRONOUS RECTIFICATION CONTROL CIRCUIT AND METHOD THEREOF

(75) Inventors: Lifeng Chen, Shanghai (CN); Teng Liu, Shanghai (CN); Hongjian Gan, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 275 days.

(21) Appl. No.: 11/470,090

(22) Filed: Sep. 5, 2006

(65) Prior Publication Data
US 2007/0091650 A1 Apr. 26, 2007

(30) Foreign Application Priority Data
Oct. 20, 2005 (TW) .............................. 94136784 A

(51) Int. Cl.
*H02M 3/335* (2006.01)
(52) U.S. Cl. ............... 363/21.06; 363/21.11; 363/21.14
(58) Field of Classification Search ............. 363/21.02, 363/21.06, 21.1, 21.11, 21.14, 26, 127
See application file for complete search history.

(56) References Cited
U.S. PATENT DOCUMENTS

| | | | |
|---|---|---|---|
| 6,262,901 B1 * | 7/2001 | Simopoulos | ................. 363/72 |
| 6,496,395 B2 * | 12/2002 | Tokunaga et al. | ............. 363/97 |
| 6,845,018 B2 * | 1/2005 | Ohishi | ..................... 363/21.06 |
| 6,870,747 B2 | 3/2005 | Bridge | |
| 6,906,489 B2 * | 6/2005 | Fukamizu et al. | ........... 318/685 |
| 6,934,167 B2 * | 8/2005 | Jang et al. | ................ 363/21.02 |
| 6,956,361 B1 * | 10/2005 | Mozipo et al. | .............. 323/283 |
| 6,961,253 B1 * | 11/2005 | Cohen | ......................... 363/89 |

* cited by examiner

*Primary Examiner*—Adolf Berhane
(74) *Attorney, Agent, or Firm*—Volpe and Koenig, P.C.

(57) ABSTRACT

The adaptive synchronous rectification control circuit and its controlling method for a power converter are provided. The proposed control circuit having a transformer with a primary and a secondary sides, a switch coupled to the primary side and a synchronous rectification transistor (SRT) coupled to the secondary side and having a parasitic diode includes a preprocessor receiving a source-drain voltage of the SRT and outputting a first signal, and a control set receiving the first signal, a pre-determined voltage and a pulse signal synchronized to the switch and generating a second signal synchronized to the switch for controlling the SRT, in which a selection of the pre-determined voltage makes the source-drain voltage of the SRT ranged from 0 to a conducting voltage of the parasitic diode of the SRT.

20 Claims, 10 Drawing Sheets

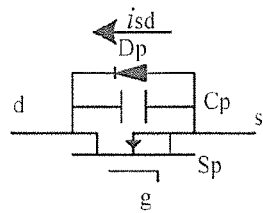
Fig. 3(a)(PRIOR ART)
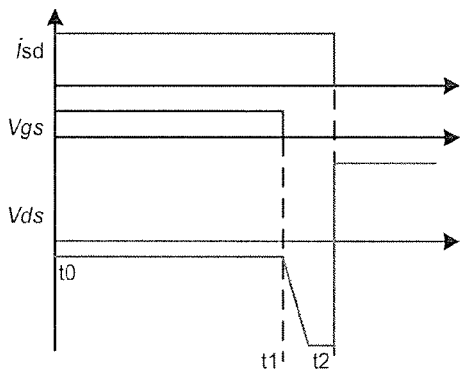 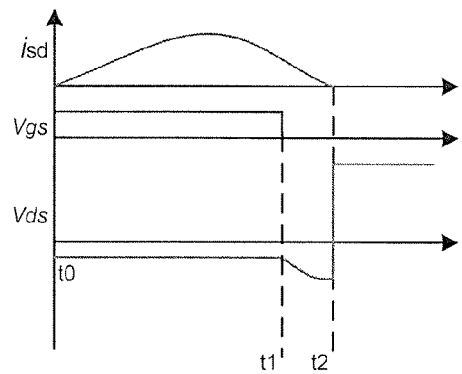
Fig. 3(b)(PRIOR ART)   Fig. 3(c)(PRIOR ART)
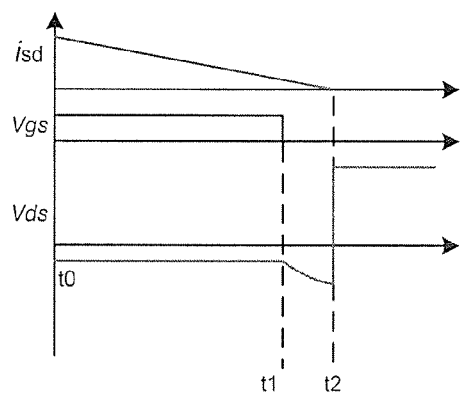
Fig. 3(d)(PRIOR ART)

ADAPTIVE SYNCHRONOUS RECTIFICATION CONTROL CIRCUIT AND METHOD THEREOF

FIELD OF THE INVENTION

The present invention relates to the adaptive synchronous rectification control circuit for a power converter and the controlling method thereof. More particularly, the present invention relates to the adaptive synchronous rectification control circuit and the controlling method thereof for a power converter having a main switch and a synchronous rectification transistor (SRT).

BACKGROUND OF THE INVENTION

Following the development of the power electronic technology, the required output voltages of certain electronic devices such as the personal computers and the communication devices are relatively lower and the output power of which are relatively higher. The conventional power electronic converter employs at least a diode for the rectification. Obviously, the positive conducting voltage-drop of the diode becomes a main reason to restrict the increase of the efficiency of the converter when the output voltage of which is relatively lower.

To solve the aforementioned problem, a general solution is to replace the diode by a transistor for the rectification, and this is the synchronous rectification technology. Nowadays, the transistors employed for the synchronous rectification are mostly metal-oxide semiconductor field-effect transistors (MOSFETs).

Please refer to FIG. 1, which shows the schematic circuit diagram of a conventional LLC-type series resonant converter (LLC-SRC). The LLC-SRC 10 of FIG. 1 employs the MOSFETs Q1 and Q2 for the synchronous rectification. Referring to FIG. 1, the resonant capacitor Cs and the resonant inductor Ls form a resonant network, Tr is a transformer having a magnetizing inductor Lm at the primary side and a central tap at the secondary side, S1 and S2 are the synchronous rectification transistors at the secondary side of the transformer Tr, D1 and C1 are the parasitic diode and the parasitic capacitor of the SRT S1, D2 and C2 are the parasitic diode and the parasitic capacitor of the SRT S2, and Co is the output capacitor.

The MOSFETs Q1 and Q2 are alternatively turned on and off, and the duty ratio of Q1 and Q2 are both 50%. A positive voltage Vr is added to the resonant network formed by the resonant capacitor Cs and the resonant inductor Ls when the MOSFET Q1 receives a control pulse signal and is turned on, the MOSFET Q2 is turned off, and the polarities of the positive voltage Vr are marked as shown in FIG. 1. At this moment, the SRT S1 at the secondary side of the transformer Tr is turned on, the voltage on the primary side of the transformer Tr is clamped by the output capacitor Co and the resonant capacitor Cs and the resonant inductor Ls are resonant. If the resonant time is less than the turn-on time of the MOSFET Q1, which means the resonant frequency of the LLC-SRC 10 is higher than the working frequency of the same, and the SRT S1 is turned off at the end of the resonance so as to avoid the generation of a reverse current.

By the same token, the SRT S1 is turned on after the MOSFET Q1 is turned off and the MOSFET Q2 is turned on and that is the beginning of the next-half resonant cycle. Also, the SRT S2 is turned off when the resonance is over so as to prevent the generation of a reverse current.

Please refer to FIG. 2, which shows the waveforms of various signals/voltages/currents of switches/resonant network/transformer versus time when the resonant frequency of the conventional LLC-SRC of FIG. 1 is relatively higher than the working frequency of the same. In which, Vgp is the control pulse signal of the MOSFETs Q1 and Q2 on the primary side of the transformer Tr, Vgs is the control pulse signal of the SRTs S1 and S2 on the secondary side of the transformer Tr, Vr is the voltage added on the resonant network (Cs+Ls), ir and im are the resonant current flowing through the resonant network (Cs+Ls) and the magnetizing current of the transformer Tr respectively, and is1 and is2 are the currents flowing through the SRTs S1 and S2 respectively.

As shown in FIG. 2, the MOSFET Q1 at the primary side of the transformer Tr is turned on, the resonant network (Cs+Ls) bears a positive voltage and is resonant, the SRT S1 on the secondary side of the transformer Tr is turned on, and the current flowing through S1 is the difference between the resonant current flowing through the resonant network (Cs+Ls) and the magnetizing current of the transformer Tr (assume that the turns ratio of the transformer Tr is 1:1) during the time period of t0 to t1. At the moment t1, the current flowing through SRT S1 is passing through the zero-crossing point, the SRT S1 is turned off, and the original resonant network (Cs+Ls) and the magnetizing inductor Lm of the transformer Tr form a new resonant network. Due to the resonant period of this new resonant network is relatively quite long, the resonant current flowing through the new resonant network could be viewed as a constant value during the time period of t1 to t3. At the moment t3, the MOSFET Q1 on the primary side of the transformer Tr and the SRT S2 on the secondary side of the transformer Tr are turned on, a negative voltage is added on the resonant network (Cs+Ls), and t3 is the beginning of the next resonant cycle.

Through the operational principles of the LLC-SRC 10, one could tell that the turn-off times of the SRTs on the secondary side of the transformer Tr have to be appropriate controlled such that the whole circuit could operate normally if the LLC-SRC 10 operates under the circumstances that the resonant period of the LLC-SRC 10 is less than the switching period of the same. Two existing controlling methods for the synchronous rectification of the conventional LLC-SRC in the prior art are: (1) Sampling and finding the zero-crossing point of the current flowing through the SRT to turn off the SRT accordingly and (2) Fixing the turn-on time of the SRT.

(1) Sampling and finding the zero-crossing point of the current flowing through the SRT to turn off the SRT accordingly The first method includes the steps of: (1) sampling the current flowing through the SRTs; and (2) turning off the SRTs at the zero-crossing point of the current flowing through the SRTs. This method has the advantage of realizing the relatively optimized control of the SRTs, and has the disadvantage that the method for sampling the current is relatively more difficult.

(2) Fixing the turn-on time of the SRT

Comparing with the first controlling method, the second controlling method, which includes the step of: fixing the turn-on time of the SRT, is relatively simpler to be accomplished, and has the disadvantage of having a relatively worse capability to adapt and the relatively optimized control of the SRTs could not be reached if the parameters of the SRTs are varied.

Besides, Bridge (U.S. Pat. No. 6,870,747) proposed a third controlling method for the adaptive synchronous rectification, which employs digital controlling method, mainly for controlling the synchronous rectification of the pulse-width modulated (PWM) converter. Through detecting whether the body/parasitic diode of the SRT is conductive or not, the SRT is controlled correspondingly.

Though the above-mentioned third controlling method could realize a relatively better control of the SRT in certain PWM converters, but the aforementioned third controlling method could not accomplish the relatively optimized control of the LLC-SRC. This is because that at the latter half-cycle of the turn-on period of the SRT, the current flowing through the SRT is almost zero such that it is hard to realize the control of the SRT by turning off the SRT at the zero-crossing point of the current on the SRT through detecting whether or not the body/parasitic diode is conductive. Besides, the above-mentioned third controlling method is relatively difficult for applying to the relatively high frequency occasions since the digital controlling method is employed and the counting accuracy of timer is restricted. Furthermore, the turn-off of the SRT has to be executed at the zero-crossing point of the current flowing through the SRT when the PWM converter is working under the discontinuous conduction mode (DCM), and the turn-off of the SRT has no direct connection with the turn-off signal of the main PWM signal. Thus, this third alternative could not achieve the relatively optimized turn-off of the SRT when the converter is working under the DCM.

Please refer to FIG. 3(a), it shows a schematic circuit diagram of the equivalent circuit of the SRT S1/S2. In FIG. 3(a), the transistor has three terminals, the source s, the drain d and the gate g, Cp is the parasitic capacitor between the drain d and the source s, and Dp is the body/parasitic diode. For the PWM converter, the current flowing through the SRT could be viewed as a constant value when the PWM converter is working under the continuous conduction mode (CCM).

FIG. 3(b) is a graph respectively illustrating the waveforms of the source-drain current of the SRT isd, the gate-source voltage Vgs and the drain-source voltage Vds versus time when the PWM converter is working under the CCM. Referring to FIG. 3(b), isd is the source-drain current of the SRT, Vgs is the control pulse signal of the SRT, and Vds is the drain-source voltage drop of the SRT (i.e., the voltage across the parasitic capacitor Cp). As shown in FIG. 3(b), the turn-on time of the SRT is less than the optimized turn-on time of the SRT since the SRT is turned off at the moment t1 when there still is a current flowing through the SRT. In which, the current charges the parasitic capacitor Cp when the SRT is turned off firstly, the voltage across the parasitic capacitor Cp, Vds, is increasing and the slope of this increase is decided by the capacitance of the parasitic capacitor Cp and the value of the current on the SRT. The voltage across the parasitic capacitor Cp, Vds, is clamped by the body diode Dp of the SRT (the parasitic diode) after Vds raises to a certain value, thus the realized value of Vds is the positive voltage drop of the body diode Dp, a current is flowing through the body diode, and the voltage across the parasitic capacitor Cp is maintained at a constant power level. Under such a circumstances, the operational efficiency of the SRT is decreased if the SRT is turned off relatively earlier.

Please refer to FIG. 3(c), which shows a graph respectively illustrating the waveforms of the source-drain current of the SRT isd, the gate-source voltage Vgs and the drain-source voltage Vds versus time when the PWM converter is working under the CCM and the SRT is turned off relatively earlier.

By the same token, the current isd charges the parasitic capacitor Cp when the SRT is turned off at the moment t1. The current isd has a relatively smaller value close to zero, the relatively smaller current isd charges the parasitic capacitor Cp and makes the voltage across the capacitor, Vds, increase slowly, and the slope of Vds is decreased slowly also. At the moment t2, when the current value of isd is at the zero-crossing point, voltage across the parasitic capacitor Cp, Vds, has not reached the clamping value of the body diode Dp yet. Through this procedure, one could tell that the third method proposed by Bridge (U.S. Pat. No. 6,870,747) for controlling the SRT, which is judged by whether or not the body diode Dp is conductive, could not reach the optimized controlling of the SRT.

Please refer to FIG. 3(d), which is a graph respectively illustrating the waveforms of the source-drain current of the SRT isd, the gate-source voltage Vgs and the drain-source voltage Vds versus time when the PWM converter is working under the DCM and the SRT is turned off relatively earlier.

As shown in FIG. 3(d), the current flowing through the SRT isd is decreasing linearly when the SRT is turned off relatively earlier at the moment t1, the relatively smaller current isd will charge the parasitic capacitor Cp, thus the voltage of the parasitic capacitor Cp, Vds, is increased slowly, and the slope of the parasitic capacitor Cp is decreased slowly too. At the moment t2, when the current isd is at the zero-crossing point, the voltage across the parasitic capacitor Cp, Vds, is lower than the voltage clamping value of the body diode Dp. Thus, only through judging whether or not the body diode Dp is conductive when the PWM converter is working under the DCM could not reach the optimized control of the SRT too.

Keeping the drawbacks of the prior arts in mind, and employing experiments and research full-heartily and persistently, the applicant finally conceived the adaptive synchronous rectification control circuit and the method thereof.

SUMMARY OF THE INVENTION

It is therefore an object of the present invention to propose an adaptive synchronous rectification control circuit and a method thereof for a power converter having a synchronous rectification transistor (SRT) with a parasitic capacitor and a parasitic diode such that the source-drain voltage of the SRT is sampled when the parasitic capacitor is charged to prevent the parasitic diode from being turned on so as to relatively optimize the control of the SRT.

According to the first aspect of the present invention, the control circuit for a power converter having a transformer with a primary and a secondary sides, a switch coupled to the primary side and a first transistor coupled to the secondary side and having a parasitic diode includes a preprocessor receiving a source-drain voltage of the first transistor and outputting a first signal, and a control set receiving the first signal, a pre-determined voltage and a pulse signal synchronized to the switch and generating a second signal synchronized to the switch for controlling the first transistor, in which a selection of the pre-determined voltage makes the source-drain voltage of the first transistor ranged from 0 to a conducting voltage of the parasitic diode of the first transistor.

Preferably, the control set includes a regulator receiving the first signal and the pre-determined voltage and outputting a third signal and a generator receiving the third signal, generating the second signal synchronized to the switch according to the pulse signal synchronized to the switch and controlling the first transistor through the second signal.

Preferably, the first transistor is a synchronous rectification transistor, the preprocessor is a signal preprocessor, the regulator is a signal regulator, the generator is a control pulse generator (CPG), the first signal is a preprocessing signal, the second signal is a control pulse signal (CPS), and the third signal is a synchronous rectification control signal (SRCS).

Preferably, the signal regulator is a proportional-integral control loop (PICL).

Preferably, the PICL includes an operational amplifier (OA) receiving the preprocessing signal, comparing the preprocessing signal with a reference potential and outputting the SRCS.

Preferably, the PICL further includes an RC circuit electrically connected to the OA in parallel, stabilizing the PICL and increasing a dynamic capability of the PICL.

Preferably, the CPG includes an inverter receiving and inverting the SRCS, a triangle wave generating circuit (TWGC) generating a triangle wave (TW) synchronized to the switch according to the inverted SRCS, a comparator comparing the SRCS with the TW and outputting a comparison signal (CS) and an AND gate executing an AND operation of the SRCS and the CS and generating the CPS accordingly.

Preferably, the CPG includes a delay circuit receiving and delaying the SRCS, a triangle wave generating circuit (TWGC) generating a triangle wave (TW) synchronized to the switch according to the delayed SRCS, a potential regulator receiving and regulating the SRCS, a comparator comparing the regulated SRCS and the TW and outputting a comparison signal (CS) and an OR gate executing an OR operation of the SRCS and the CS and generating the CPS accordingly.

Preferably, the TWGC includes a second transistor being turned on and off according to the delayed SRCS and an RC circuit being discharged when the transistor is turned on and being charged when the transistor is turned off.

Preferably, the TWGC includes a second transistor being turned on and off according to the inverted SRCS and an RC circuit being discharged when the second transistor is turned on and being charged when the second transistor is turned off.

Preferably, the power converter is one of a resonant converter and a discontinuous conduction mode pulse width modulated converter.

Preferably, the preprocessor includes a sampling-shaping circuit being conductive when the source-drain voltage is negative and outputting a positive voltage and a valley detection circuit receiving the positive voltage, comparing the positive voltage with a valley signal and outputting the first signal.

Preferably, the sampling-shaping circuit includes a diode.

Preferably, the sampling-shaping circuit includes a plurality of diodes electrically connected in series.

Preferably, the valley detection circuit includes a comparator and a diode electrically connected with the comparator in reverse series.

Preferably, the first transistor further includes a parasitic capacitor, and the source-drain voltage of the first transistor is sampled when the parasitic capacitor is charged.

According to the second aspect of the present invention, the controlling method of a control circuit for a power converter having a transformer with a primary and a secondary sides, a main switch coupled to the primary side and a synchronous rectification transistor (SRT) coupled to the secondary side and having a parasitic diode and a parasitic capacitor includes the steps of: (a) sampling a source-drain voltage of the SRT when the parasitic capacitor of SRT is charging; (b) comparing the sampled source-drain voltage with a specific voltage and obtaining a synchronous rectification control signal (SRCS); and (c) obtaining a control pulse signal (CPS) according to the SRCS and a synchronous pulse signal (SPS) of the main switch so as to make a charging time of the parasitic capacitor of the SRT relatively minimized, in which the specific voltage is smaller than a conducting voltage of the parasitic diode of the SRT.

Preferably, the power converter is one of a resonant converter and a discontinuous conduction mode pulse width modulated converter.

Preferably, the step (b) further includes the steps of: (b1) receiving the source-drain voltage of the SRT and engaging a preprocessing procedure; and (b2) generating the SRCS according to the preprocessing procedure.

Preferably, the step (c) further includes the steps of: (c1) generating the CPS synchronized to the main switch according to the SPS synchronized to the main switch; and (c2) controlling the SRT via the CPS.

The present invention may best be understood through the following descriptions with reference to the accompanying drawings, in which:

BRIEF DESCRIPTION OF THE DRAWINGS

FIG. 3(a) is a schematic circuit diagram of the equivalent circuit of a synchronous rectification transistor;

FIG. 3(b) is a graph respectively illustrating the waveforms of the source-drain current of the SRT, the gate-source voltage and drain-source voltage versus time when the PWM converter is working under the CCM;

FIG. 3(c) is a graph respectively illustrating the waveforms of the source-drain current of the SRT, the gate-source voltage and drain-source voltage versus time when the PWM converter is working under the CCM and the SRT is turned off relatively earlier;

FIG. 3(d) is a graph respectively illustrating the waveforms of the source-drain current of the SRT, the gate-source voltage and drain-source voltage versus time when the PWM converter is working under the DCM and the SRT is turned off relatively earlier;

DETAILED DESCRIPTION OF THE PREFERRED EMBODIMENT

Figure 4:
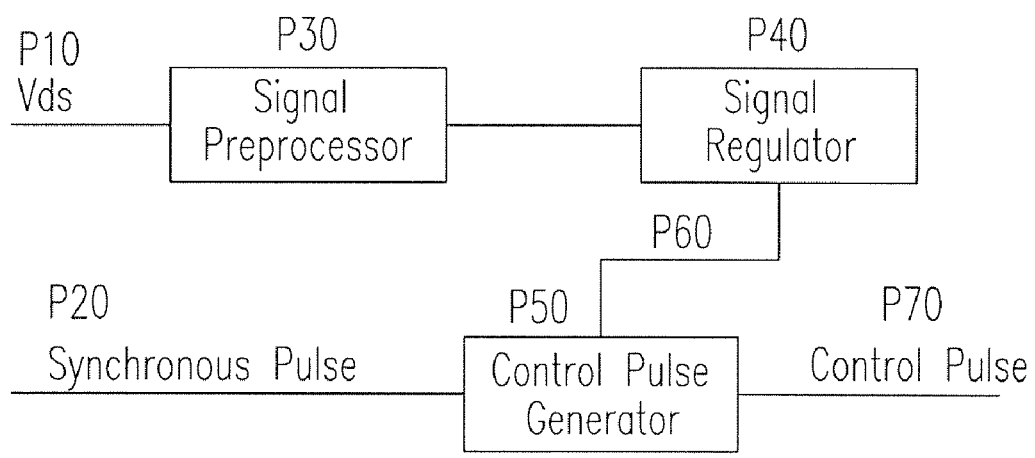
FIG. 4 is a block diagram of an adaptive synchronous rectification control circuit of the present invention.

Please refer to FIG. 4, which shows a block diagram of an adaptive synchronous rectification control circuit of the present invention. The control circuit requires two input signals. The first input signal P10 is the difference between the voltage at the drain and the voltage at the source Vds, which is the voltage across the parasitic capacitor Vcp. The second input signal P20 is the synchronous pulse signal of the switches on the primary side of the transformer Tr (e.g., Q1 and Q2 of FIG. 1), which makes the turn-on of the SRT (e.g., S1/S2 of FIG. 1) be synchronized with the main switch (e.g., Q1 of FIG. 1) at the same time period. Notice that the driving signal Vgp of the switches Q1 and Q2 on the primary side of the transformer Tr of FIG. 2 is employed to explain the present invention, but any signal synchronous to the driving signal Vgp could be employed in the present invention too.

In FIG. 4, the signal preprocessor P30 receives the voltage across the parasitic capacitor of the SRT Vcp (i.e., Vds) and proceeds the proper preprocessing toward Vds to facilitate the relative testing and controlling. The signal regulator, P40, receives the preprocessed signal and engages the relative regulation through a closed-looped analog control, and generate a signal P60, which could reflect the optimized control of the SRT. The control pulse generator P50 generates the control pulse signal P70 according to the control signal P60 outputting from the signal regulator P40 and the synchronous pulse signal P20, and the control pulse signal P70 is synchronous with the main switch (e.g., Q1 of FIG. 1) at the same time period also.

Figure 5:
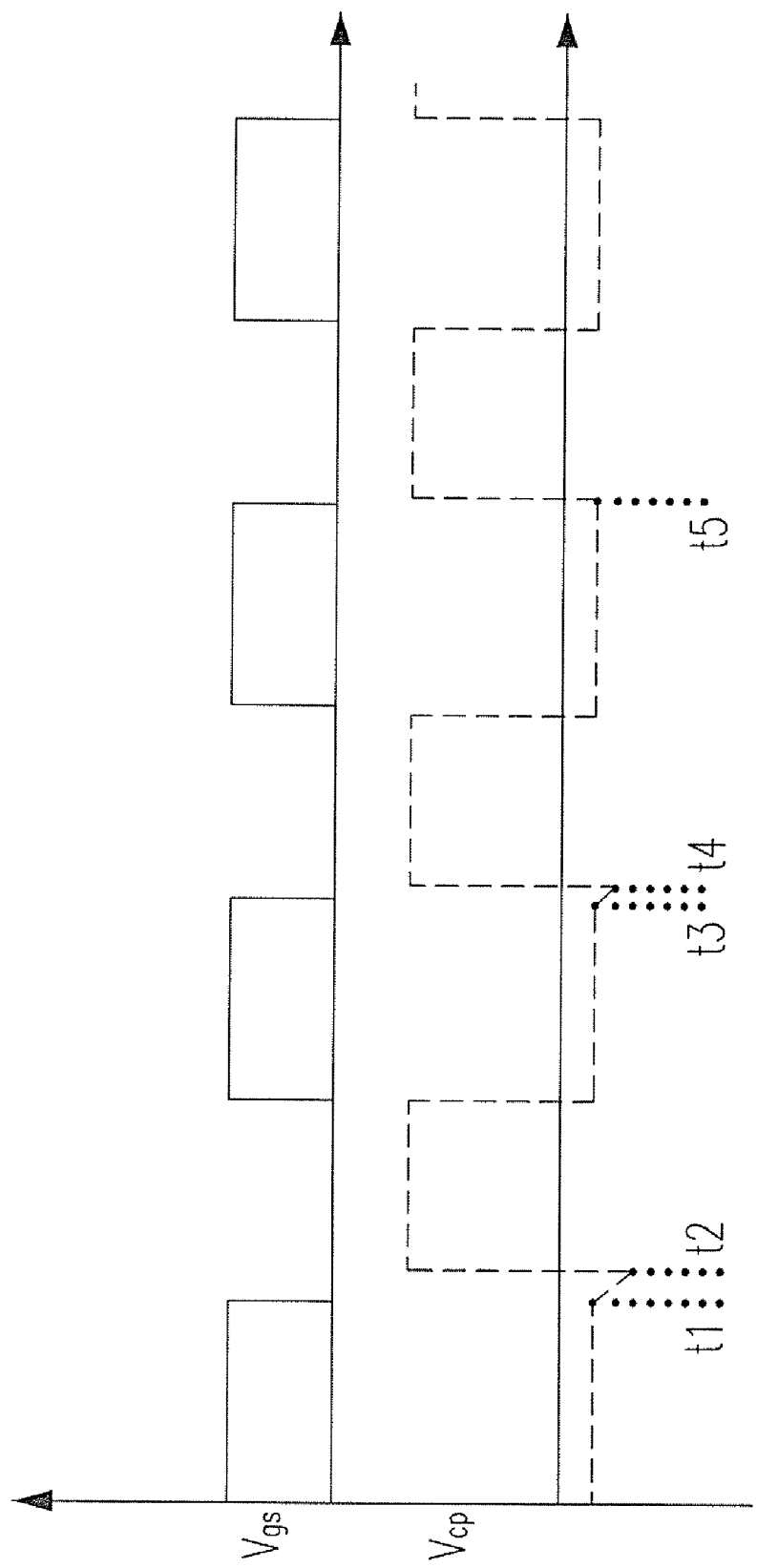
FIG. 5 is a graph respectively illustrating the waveforms of the gate-source voltage of the SRT and the voltage across the parasitic capacitor of the SRT versus time when the power converter employs the adaptive synchronous rectification control circuit of FIG. 4.

Please refer to FIG. 5, which shows a graph respectively illustrating the waveforms of the gate-source voltage of the SRT Vgs and the voltage across the parasitic capacitor of the SRT Vcp, (i.e., Vds) versus time when the power converter employs the adaptive synchronous rectification control circuit of FIG. 4.

As shown in FIG. 5, the SRT is turned off at the moment t1 of the first turn-on/off cycle of the SRT. Since the SRT is turned off relatively too earlier, there is a small current isd flowing through the SRT, and this small current isd would charge the parasitic capacitor of the SRT such that the peak value of the Vcp during the time period t1-t2 of FIG. 5 is generated. The control circuit of FIG. 4 generates a relatively optimized control pulse signal through sensing the voltage across the parasitic capacitor of the SRT Vcp and generating the relative regulation by the closed-looped analog control. In the next turn-on/off cycle of t2-t3, the SRT is turned off at the moment t3, and relatively the turn-off of the SRT is still a little bit too earlier such that the control circuit engages in the optimization of the control pulse signal again. After several turn-on/off cycles, the optimized control pulse signal is finally obtained. Referring to FIG. 5, there is no more peak value of Vcp in the turn-on/off cycle of t4-t5, and the control pulse signal is optimized since then.

Figure 6:
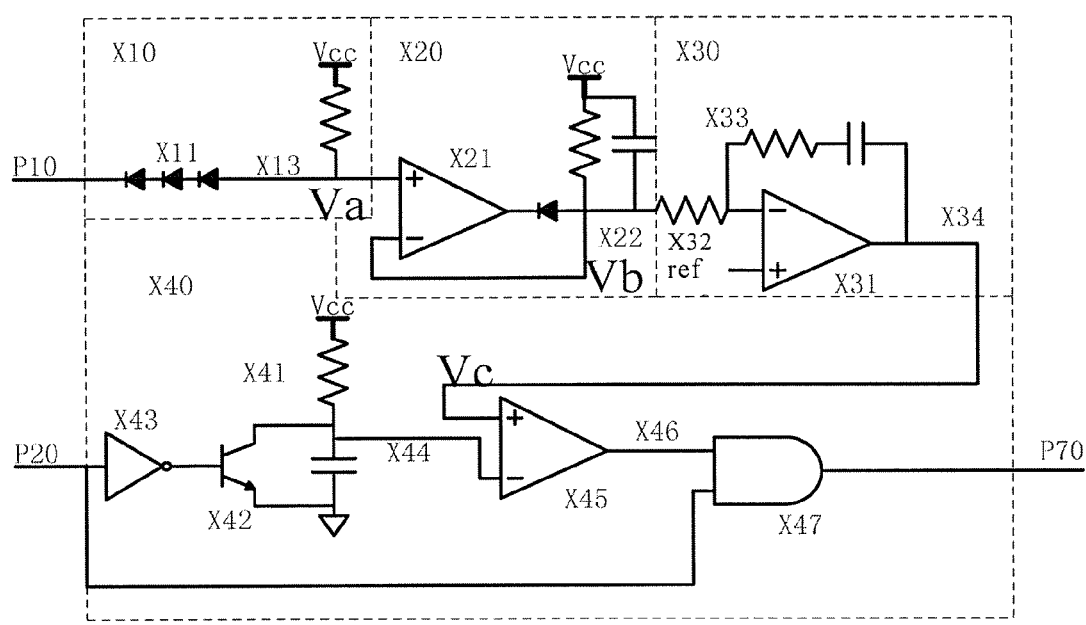
FIG. 6 is a schematic circuit diagram of the first preferred embodiment of the adaptive synchronous rectification control circuit of FIG. 4.

Please refer to FIG. 6, which shows a schematic circuit diagram of the first preferred embodiment of the adaptive synchronous rectification control circuit of FIG. 4. In FIG. 6, the control circuit includes a sampling-shaping circuit X10, a valley detection circuit X20, a proportional-integral control loop (PICL) X30, a control pulse generator X40, and the control circuit has two input signals. The first input signal P10 is the voltage across the parasitic capacitor of the SRT, Vcp. The second input signal P20 is the synchronous pulse signal of the switches on the primary side of the transformer Tr (e.g., Q1 and Q2 of FIG. 1), Vgp. P70 is the lastly outputted signal of the control circuit, which is the relatively optimized control signal of the SRT (e.g., S1/S2 of FIG. 1), Vgs.

In the sampling-shaping circuit X10, three diodes X11 are positive conductive so as to get the biased positive voltage Va (namely X13), which is biased to facilitate the sampling, when the voltage across the parasitic capacitor of the SRT, Vcp, is negative that is to say there is a current flowing through the SRT. Notice that the number of diodes of X11 is not limited to three as shown in FIG. 6. Namely, X11 having at least a diode would achieve the purpose of providing the biased positive voltage Va. The parasitic capacitors of the SRTs (e.g., S1 and S2 of FIG. 1), bear a relatively high positive voltage, and all three diodes of X11 bear a reverse voltage and are turned off, which would block the relatively high positive voltage of the parasitic capacitor of SRT to prevent the control elements of FIG. 6 from damaging when the SRTs (e.g., S1 and S2 of FIG. 1) are turned off reversely.

Figure 7A:
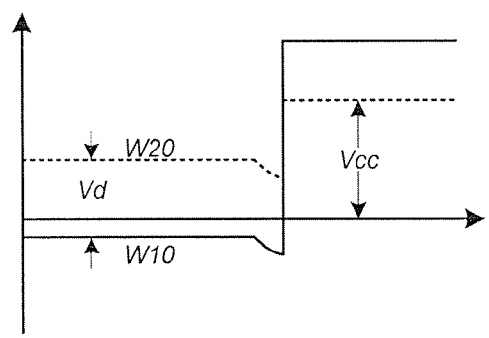
FIG. 7(a) is a graph respectively illustrating the waveforms of the various voltages of the sampling-shaping circuit of FIG. 6 versus time.

FIG. 7(a) is a graph respectively illustrating the waveforms of the various voltages of the sampling-shaping circuit X10 of FIG. 6 versus time. As shown in FIG. 7(a), the voltage across the parasitic capacitor of the SRT, Vcp (W10 of FIG. 7(a)), is negative when there is a current flowing through the SRT. And the voltage across the parasitic capacitor of the SRT, Vcp, is a relatively high positive value, which is decided by the parameters of the control circuit when the SRTs (e.g., S1 and S2 of FIG. 1) are turned off reversely. Va (W20 of FIG. 7(a)) is the waveform of the shaped sampling voltage, and Vd is the voltage drop of the positive conduction of the three diodes. The sampling voltage is the control voltage Vcc when SRTs (e.g., S1 and S2 of FIG. 1) bear the positive voltage such that all three diodes of X11 bear the reverse voltage and are blocked.

X20 of FIG. 6 is a valley detection circuit and is employed to detect the lowest value of Va. The comparator X21 is used to compare the input signal Va and the valley-value signal Vb (i.e., X22 of FIG. 6). If the input signal Va is larger than the valley-value signal Vb, the output of the comparator X21 is a relatively high voltage level, and the valley-value signal Vb is kept unchanged. If the input signal Va is smaller than the valley-value signal Vb, the output of the comparator X21 is a relatively low voltage level, and the valley-value signal Vb is decreased dramatically to reach the lowest value of Va.

Figure 7B:
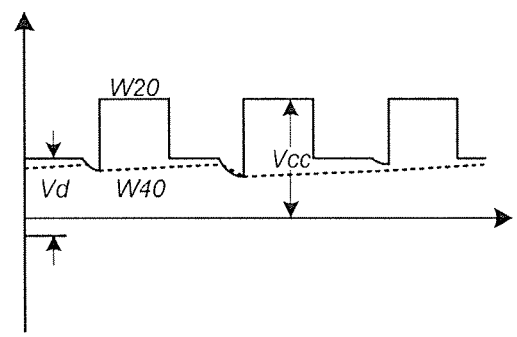
FIG. 7(b) is a graph respectively illustrating the waveforms of the various voltages of the valley detection circuit of FIG. 6 versus time.

Referring to FIG. 7(b), it is a graph respectively illustrating the waveforms of the various voltages of the valley detection circuit X20 of FIG. 6 versus time. In FIG. 7(b), Va (W20 of FIG. 7(b)) is the waveform of the shaped sampling voltage, and Vb (W40 of FIG. 7(b)) is the waveform of the valley-value signal at the terminal of X22. The valley-value signal Vb is decreased to the valley-value of the input signal Va when the valley-value signal Vb is larger than the input signal Va, and the valley-value signal Vb does not response to the input signal Va when the valley-value signal Vb is smaller than the input signal Va.

The PICL X30 of FIG. 6 includes an operational amplifier (OA) X31. The OA X31 receives the valley-value signal Vb outputting from the valley detection circuit X20 and a reference potential Vref (X32 of FIG. 6) and engages the proportional amplify of an error signal so as to realize a closed-looped circuit control and output a control voltage Vc (X34 of FIG. 6). Vref (X32 of FIG. 6) is a fixed reference potential, and the value of Vref decides to what extent the SRTs (e.g., S1 and S2 of FIG. 1) at work are optimized. Specifically speaking, Vref equals the biased potential of the three diodes of X11 minus a relatively smaller value (e.g., 0.1V) such that the voltage values across the parasitic capacitors of the SRTs (e.g., S1 and S2 of FIG. 1) could be controlled at −0.1V through the closed-looped circuit control of the PICL X30 so as to accomplish the optimized control of the SRTs. Besides, the PICL X30 further includes an RC circuit X33 to reinforce the stability and the dynamic capability of this closed-looped PICL X30.

Since the output of the closed-looped PICL X30, X34, would be applied to the SRTs (e.g., S1 and S2 of FIG. 1) at the next turn-on/off cycle, the relatively low-speed elements could be used in the OA X31 and the valley detection circuit X20, and would not influence the controlling capabilities of the same.

Figure 1:
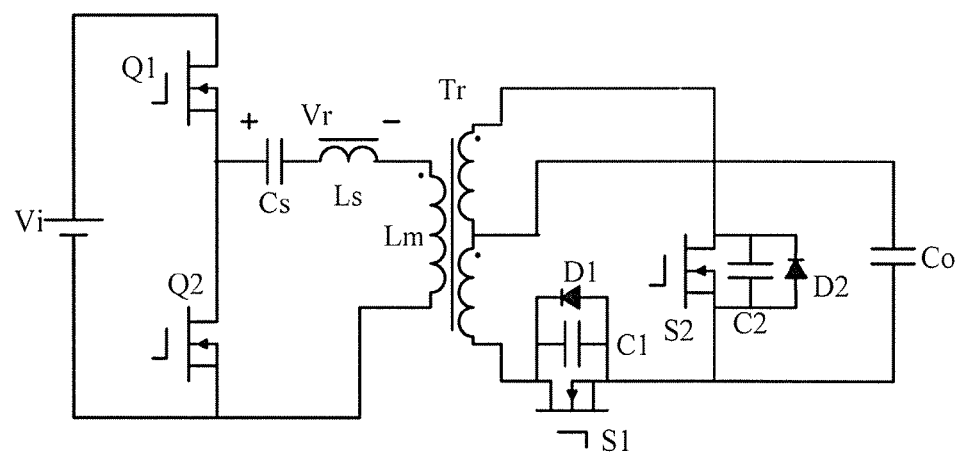
FIG. 1 is a schematic circuit diagram showing a conventional LLC-SRC.
Figure 2:
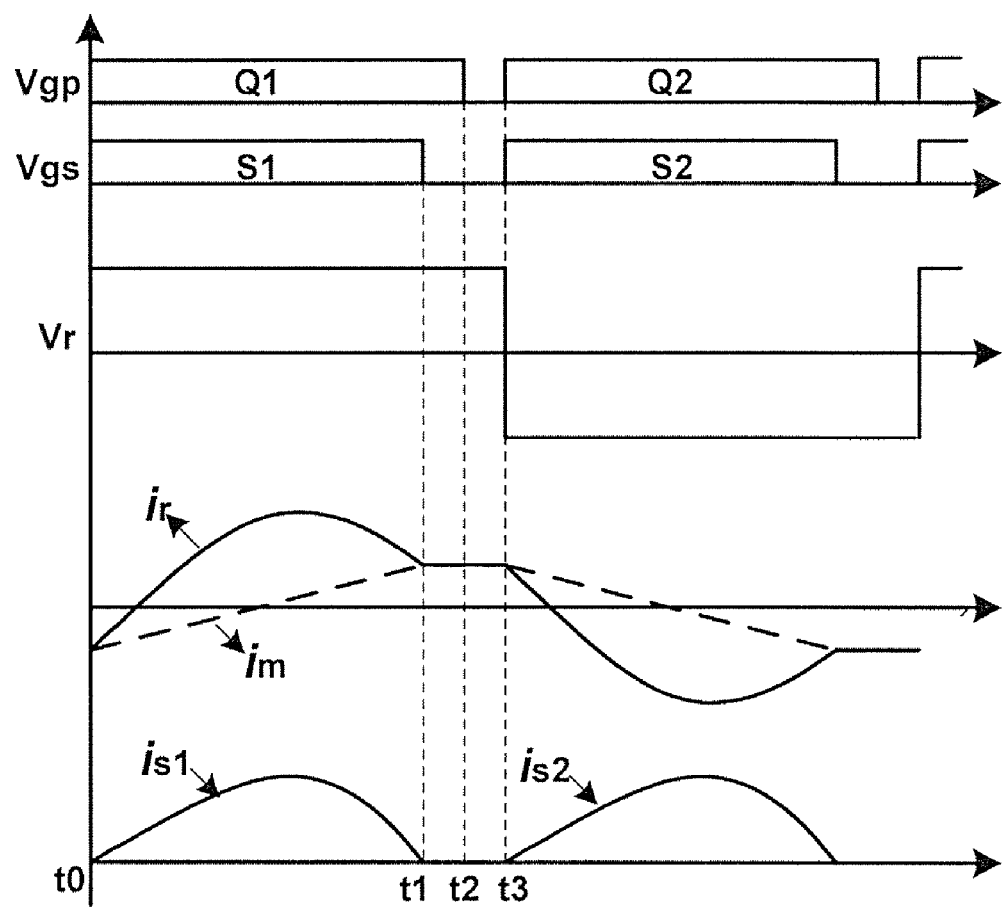
FIG. 2 is a graph illustrating the waveforms of various signals/voltages/currents of switches/resonant network/transformer versus time when the resonant frequency of the conventional LLC-SRC of FIG. 1 is relatively higher than the working frequency of the same.

In the control pulse generator X40, the inputting control signal Vc (X34) generated by the PICL X30 is transformed into a corresponding turn-on time of the SRTs (e.g., S1 and S2 of FIG. 1). Here, a method includes the step of: comparing the control signal Vc with a triangle wave so as to generate a control pulse signal is employed. The control pulse generator X40 includes a triangle wave generating circuit X41 having an RC charging circuit and a transistor X42. The RC charging circuit charges when the transistor X42 is turned off and the voltage across the capacitor increases gradually. The capacitor discharges through the transistor X42 immediately when the transistor X42 is turned off and the voltage across the capacitor decreases dramatically. Here, the driving signal of the switches on the primary side of the transformer Tr (e.g., Q1 and Q2 of FIG. 1) is employed as the synchronous control signal, and the turn-on/off of the transistor X42 is controlled by the synchronous control signal (the control signal of the switches on the primary side of the transformer Tr, e.g., Q1 and Q2) Vgp, the control signal Vgp is reversed by a NOT gate firstly and employed as the control potential of the transistor X42 secondly. Not only the triangle wave Vtriangle (X44) is generated but also the triangle wave Vtriangle is synchronized with the control signal Vgp on the primary side of the transformer Tr. The comparator X45 receives the triangle wave Vtriangle (X44) and the control voltage Vc (X34) generated by the PICL X30 and generates the comparison signal X46. The AND gate X47 receives the comparison signal X46 and the control signal of the switches on the primary side of the transformer Tr (e.g., Q1 and Q2 of FIG. 1), Vgp, and generates the control pulse signal P70 lastly.

Figure 8:
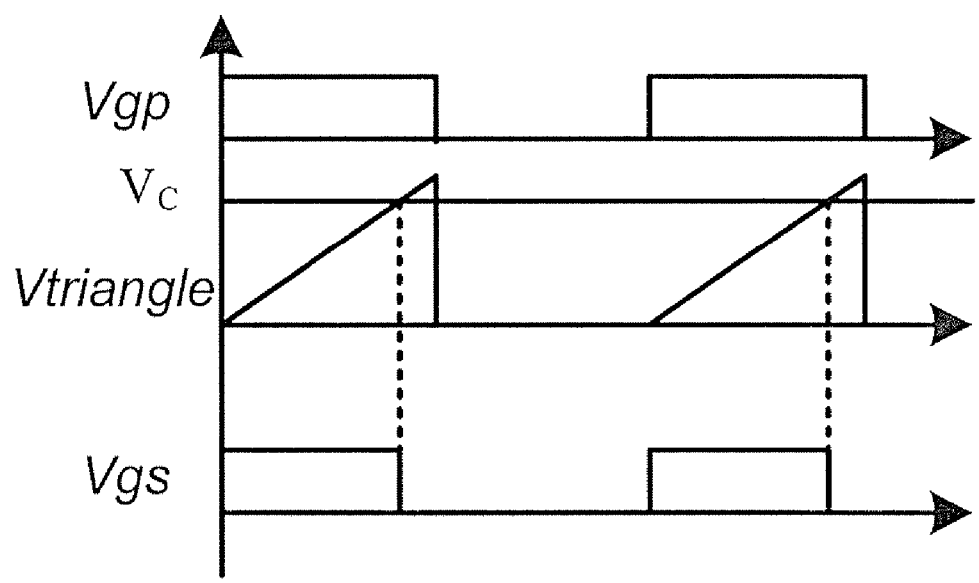
FIG. 8 is a graph respectively illustrating the waveforms of the various signals for controlling the conduction of the SRT of FIG. 6 versus time.

Please refer to FIG. 8, which shows a graph respectively illustrating the waveforms of the various signals for controlling the conduction of the SRT of FIG. 6 versus time. In FIG. 8, the triangle wave Vtriangle (X44) is generated by the triangle wave generating circuit X41 using the control signal of the switches on the primary side of the transformer Tr, Vgp, and the control pulse signal Vgs (P70) is generated through the comparator X45, which receives the triangle wave Vtriangle and the control voltage Vc (X34) and generates the comparison signal X46, and the AND gate X47, which receives the comparison signal X46 and the control signal on the primary side of the SRT, Vgp (P20), lastly. As shown in FIG. 8, the control pulse signal Vgs (P70) is turned on synchronously following the control signal of the switches on the primary side of the transformer Tr (e.g., Q1 and Q2 of FIG. 1), Vgp, and turned off according to the control of the closed looped PICL X30.

Through incorporating the proposed adaptive synchronous rectification control circuit and the method thereof into the LLC-SRC, the turn-off time of the synchronous rectification could be relatively optimized. Since the provided controlling method sampling the voltage across the parasitic capacitor of the SRT (e.g., S1/S2 of FIG. 1), Vcp, and employing the valley-value of the Vcp, the accuracy of the control of the proposed controlling method could be relatively raised. Besides, the introducing of the closed-looped PICL X30 reinforces the stability of the provided controlling method, relatively optimizes the control of the adaptive synchronous rectification control circuit, and has the self-regulating capability via PICL.

The advantages of the provided controlling method include the proposed control circuit has relatively less components, simpler configuration, and less requirements toward the elements of the proposed control circuit. Furthermore, there is not any problem regarding the accuracy of time counting since the analog controlling method is involved instead of the digital controlling method.

The proposed controlling method of the present invention is not only for the LLC-SRC but also for the different types of resonant converters and the PWM converters working under the DCM (e.g., the flyback converter). As aforementioned, the turn-off of the SRT has to be executed at the zero-crossing point of the current flowing through SRT when the PWM converter is working under the discontinuous conduction mode (DCM), and the turn-off of the SRT has no direct connection with the turn-off signal of the main PWM signal, and the proposed controlling method could be employed to control the SRT and make the SRT turn off at the zero-crossing point of the current flowing through the SRT.

Besides, the proposed controlling method could be applied to control the turn-on time of the SRT of the power converter. Please refer to FIG. 9, which shows a schematic circuit diagram of the second preferred embodiment of the adaptive synchronous rectification control circuit of FIG. 4 for controlling the turn-on time of the SRT of the power converter.

Figure 9:
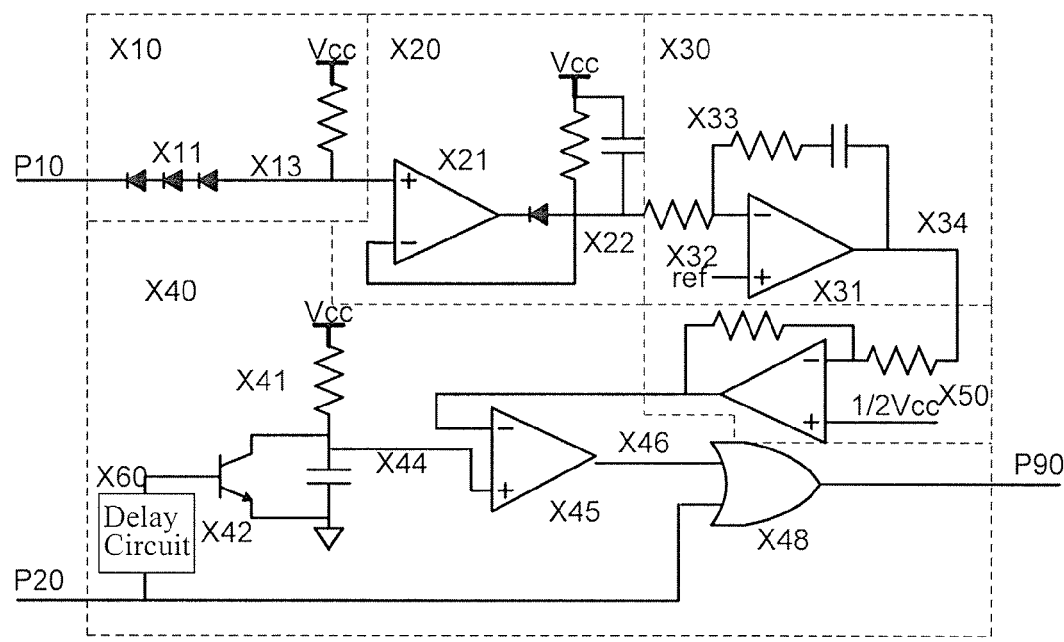
FIG. 9 is a schematic circuit diagram of the second preferred embodiment of the adaptive synchronous rectification control circuit of FIG. 4.

In FIG. 9, the proposed adaptive synchronous rectification control circuit includes a sampling-shaping circuit X10, a valley detection circuit X20, a PICL X30, a control pulse generator X40 as shown in FIG. 6 also. Referring to FIG. 9, the proposed control circuit further includes a potential regulator X50 and a delay circuit X60, and the AND gate X47 is replaced by an OR gate X48, which are different from the corresponding part of FIG. 6. As shown in FIG. 9, the potential regulator X50 is employed to regulate the power potential so as to maintain the proper accuracy of the control circuit, and the delay circuit is employed to let the control pulse signal P90 receive the correct synchronous pulse signal. Through the relatively optimized control of the turn-on time of the SRT (e.g., S1/S2 of FIG. 1), the control pulse signal P90 for relatively optimized controlling of the turn-on time of the SRT is generated lastly.

Figure 10:
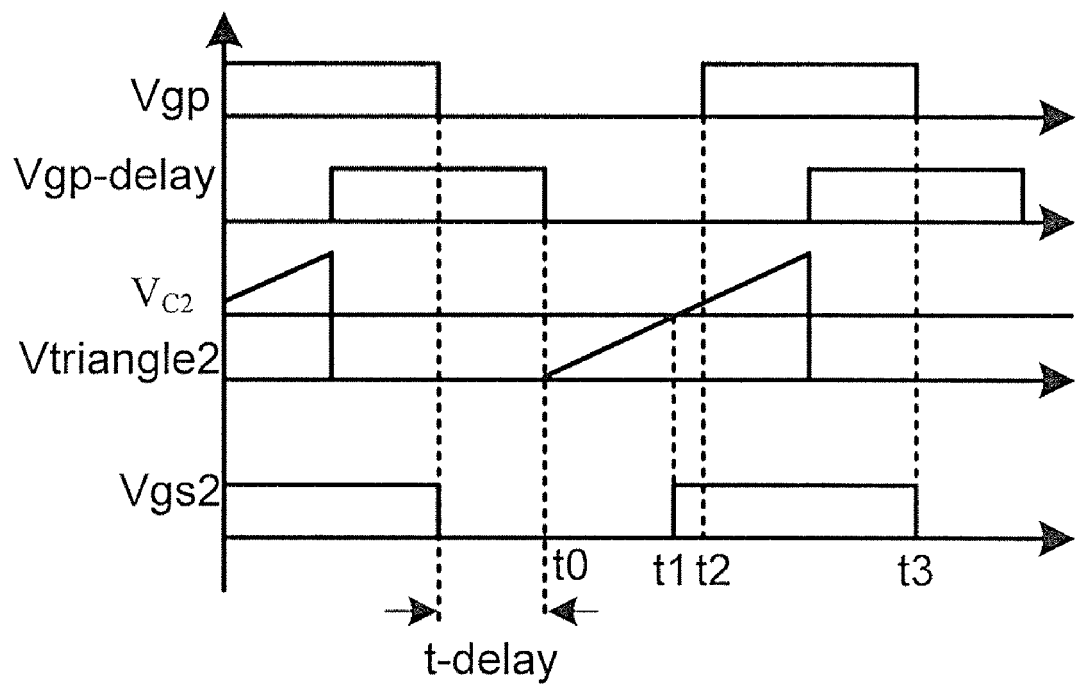
FIG. 10 is a graph respectively illustrating the waveforms of the various signals for controlling the conduction of the SRT via the control circuit of FIG. 9 versus time.

Please refer to FIG. 10, which shows a graph respectively illustrating the waveforms of the various signals for controlling the conduction of the SRT (e.g., S1/S2 of FIG. 1) via the control circuit of FIG. 9 versus time. As shown in FIG. 10, the delay circuit X60 receives the control signal of the switches on the primary side of the transformer Tr (e.g., Q1 and Q2 of FIG. 1), Vgp, and generates the delayed signal Vgp-delay, and the delay-time is t-delay. The triangle wave generating circuit X41 generates the triangle wave Vtriangle2 (X44) as shown in FIG. 10, and the triangle wave Vtriangle2 is synchronized with the delayed signal Vgp-delay, that is to say the triangle wave Vtriangle2 is synchronized with the control signal of the switches on the primary side of the transformer Tr (e.g., Q1 and Q2 of FIG. 1), Vgp. The control voltage Vc2 is the proportional-integral control signal generated by the potential regulator X50, which receives the control voltage Vc (X34) generated by the PICL X30, and the control pulse signal Vgs2 (P90) is generated through the comparator X45, which receives the triangle wave Vtriangle2 (X44) and the control voltage Vc2 and generates the comparison signal X46, and the OR gate X48, which receives the comparison signal X46 and the control signal of the switches on the primary side of the transformer Tr (e.g., Q1 and Q2 of FIG. 1), Vgp (P20), lastly. Referring to FIG. 10, the control pulse signal Vgs2 (P90) is turned on according to the control of the closed looped PICL X30, and turned off synchronously following the control signal of the switches on the primary side of the transformer Tr, Vgp, such that the optimized turn-on of the SRT is achieved.

In conclusion, the provided adaptive synchronous rectification control circuit and the method thereof could be applied to the relatively optimized control of the turn-on and the turn-off of the SRT simultaneously such that the relatively optimized control of SRT could be achieved.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A control circuit for a power converter having a transformer with a primary and a secondary sides, a switch coupled to said primary side and a first transistor coupled to said secondary side and having a parasitic diode, comprising:
    a preprocessor receiving a source-drain voltage of said first transistor and outputting a first signal; and
    a control set receiving said first signal, a pre-determined voltage and a pulse signal synchronized to said switch and generating a second signal synchronized to said switch for controlling said first transistor,
    wherein a selection of said pre-determined voltage makes said source-drain voltage of said first transistor ranged from 0 to a conducting voltage of said parasitic diode of said first transistor.

2. The control circuit according to claim 1, wherein said control set comprises a regulator receiving said first signal and said pre-determined voltage and outputting a third signal and a generator receiving said third signal, generating said second signal synchronized to said switch according to said pulse signal synchronized to said switch and controlling said first transistor through said second signal.

3. The control circuit according to claim 2, wherein said first transistor is a synchronous rectification transistor, said preprocessor is a signal preprocessor, said regulator is a signal regulator, said generator is a control pulse generator (CPG), said first signal is a preprocessing signal, said second signal is a control pulse signal (CPS), and said third signal is a synchronous rectification control signal (SRCS).

4. The control circuit according to claim 3, wherein said signal regulator is a proportional-integral control loop (PICL).

5. The control circuit according to claim 4, wherein said PICL comprises:
    an operational amplifier (OA) receiving said preprocessing signal, comparing said preprocessing signal with a reference potential and outputting said SRCS.

6. The control circuit according to claim 5, wherein said PICL comprises:
    an RC circuit electrically connected to said OA in parallel, stabilizing said PICL and increasing a dynamic capability of said PICL.

7. The control circuit according to claim 3, wherein said CPG further comprises:
    an inverter receiving and inverting said SRCS;
    a triangle wave generating circuit (TWGC) generating a triangle wave (TW) synchronized to said switch according to said inverted SRCS; a comparator comparing said SRCS with said TW and outputting a comparison signal (CS); and
    an AND gate executing an AND operation of said SRCS and said CS and generating said CPS accordingly.

8. The control circuit according to claim 7, wherein said TWGC comprises:
    a second transistor being turned on and off according to said inverted SRCS; and
    an RC circuit being discharged when said second transistor is turned on and being charged when said second transistor is turned off.

9. The control circuit according to claim 3, wherein said CPG comprises:
    a delay circuit receiving and delaying said SRCS;
    a triangle wave generating circuit (TWGC) generating a triangle wave (TW) synchronized to said switch according to said delayed SRCS; a potential regulator receiving and regulating said SRCS;
    a comparator comparing said regulated SRCS and said TW and outputting a comparison signal (CS); and
    an OR gate executing an OR operation of said SRCS and said CS and generating said CPS accordingly.

10. The control circuit according to claim 9, wherein said TWGC comprises:
    a second transistor being turned on and off according to said delayed SRCS; and
    an RC circuit being discharged when said transistor is turned on and being charged when said transistor is turned off.

11. The control circuit according to claim 1, wherein said power converter is one of a resonant converter and a discontinuous conduction mode pulse width modulated converter.

12. The control circuit according to claim 1, wherein said preprocessor comprises:
    a sampling-shaping circuit being conductive when said source-drain voltage is negative and outputting a positive voltage; and
    a valley detection circuit receiving said positive voltage, comparing said positive voltage with a valley signal and outputting said first signal.

13. The control circuit according to claim 12, wherein said sampling-shaping circuit comprises a diode.

14. The control circuit according to claim 12, wherein said sampling-shaping circuit comprises a plurality of diodes electrically connected in series.

15. The control circuit according to claim 12, wherein said valley detection circuit comprises a comparator and a diode electrically connected with said comparator in reverse series.

16. The control circuit according to claim 1, wherein said first transistor further comprises a parasitic capacitor, and said source-drain voltage of said first transistor is sampled when said parasitic capacitor is charged.

17. A controlling method of a control circuit for a power converter having a transformer with a primary and a secondary sides, a main switch coupled to said primary side and a synchronous rectification transistor (SRT) coupled to secondary side and having a parasitic diode and a parasitic capacitor, comprising the steps of:
    (a) sampling a source-drain voltage of said SRT when said parasitic capacitor of SRT is charging;
    (b) comparing said sampled source-drain voltage with a specific voltage and obtaining a synchronous rectification control signal (SRCS); and (c) obtaining a control pulse signal (CPS) according to said SRCS and a synchronous pulse signal (SPS) of said main switch so as to make a charging time of said parasitic capacitor of said SRT relatively minimized, wherein said specific voltage is smaller than a conducting voltage of said parasitic diode of said SRT.

18. The method according to claim 17, wherein said power converter is one of a resonant converter and a discontinuous conduction mode pulse width modulated converter.

19. The method according to claim 17, wherein said step (b) further comprises the steps of:

(b1) receiving said source-drain voltage of said SRT and engaging a preprocessing procedure; and (b2) generating said SRCS according to said preprocessing procedure.

20. The method according to claim 17, wherein said step (c) further comprises the steps of:

(c1) generating said CPS synchronized to said main switch according to said SPS synchronized to said main switch; and (c2) controlling said SRT via said CPS.

* * * * *